US012096362B2

(12) United States Patent
Xue

(10) Patent No.: US 12,096,362 B2
(45) Date of Patent: Sep. 17, 2024

(54) COMMUNICATION METHOD AND APPARATUS

(71) Applicant: HUAWEI TECHNOLOGIES CO., LTD., Shenzhen (CN)

(72) Inventor: Lixia Xue, Beijing (CN)

(73) Assignee: HUAIA/E1 TECHNOLOGIES CO., LTD., Shenzhen (CN)

( * ) Notice: Subject to any disclaimer, the term of this patent is extended or adjusted under 35 U.S.C. 154(b) by 563 days.

(21) Appl. No.: 17/371,654

(22) Filed: Jul. 9, 2021

(65) Prior Publication Data

US 2021/0345248 A1 Nov. 4, 2021

Related U.S. Application Data

(63) Continuation of application No. PCT/CN2020/071543, filed on Jan. 10, 2020.

(30) Foreign Application Priority Data

Jan. 11, 2019 (CN) .......................... 201910027928.1

(51) Int. Cl.
H04W 72/23 (2023.01)
H04L 1/1812 (2023.01)
(Continued)

(52) U.S. Cl.
CPC ....... *H04W 52/0229* (2013.01); *H04L 1/1812* (2013.01); *H04W 72/0446* (2013.01); *H04W 72/23* (2023.01)

(58) Field of Classification Search
CPC ......... H04W 52/0229; H04W 72/0446; H04W 72/23; H04W 72/21; H04W 52/0216;
(Continued)

(56) References Cited

U.S. PATENT DOCUMENTS

2014/0086110 A1  3/2014 Lee et al.
2015/0092645 A1  4/2015 Tabet et al.
(Continued)

FOREIGN PATENT DOCUMENTS

CN   102421148 A   4/2012
CN   103155654 A   6/2013
(Continued)

OTHER PUBLICATIONS

VIVO: "Design considerations for standalone operation in NR unlicensed spectrum", 3GPP Draft; R1-1803858, 3GPP, vol. RAN WG1, No. Sanya, China; Apr. 16, 2018-Apr. 20, 2018, total 4 pages.
(Continued)

*Primary Examiner* — Julio R Perez
(74) *Attorney, Agent, or Firm* — Rimon PC

(57) ABSTRACT

This application discloses a communication method and apparatus. In embodiments of this application, when a terminal device in a sleep state needs to send a scheduling request or a negative acknowledgement (NACK), the terminal device enters a wake-up state. The terminal device can receive, within a sleep time period, a physical downlink control channel that schedules a resource for the scheduling request or the NACK, without waiting for the sleep time period to end before receiving the physical downlink control channel. Therefore, power consumption of the terminal device is reduced, while it is still ensured that certain physical downlink control channel is received as early as possible, thereby reducing a delay of the physical downlink control channel.

20 Claims, 10 Drawing Sheets

(51) Int. Cl.
*H04W 52/02* (2009.01)
*H04W 72/0446* (2023.01)

(58) Field of Classification Search
CPC .............. H04W 76/28; H04W 52/0235; H04L 1/1812; H04L 1/0026; H04L 1/0035; H04L 5/0055; H04L 1/1607; Y02D 30/70
See application file for complete search history.

(56) References Cited

U.S. PATENT DOCUMENTS

2018/0198572 A1 7/2018 Wang et al.
2018/0351659 A1 12/2018 Nimmala et al.

FOREIGN PATENT DOCUMENTS

| CN | 108307406 A | 7/2018 |
|----|-------------|--------|
| EP | 3226456 A1 | 10/2017 |
| WO | 2017166814 A1 | 10/2017 |
| WO | 2018059020 A1 | 4/2018 |
| WO | 2018213152 A1 | 11/2018 |

OTHER PUBLICATIONS

Ericsson, ST-Ericsson, Broadcom, PDCCH monitoring during adaptive UL retransmission grants. 3GPP TSG-RAN WG2 #79, Qingdao, China Aug. 13 17, 2012, R2-124070, 5 pages.

COMMUNICATION METHOD AND APPARATUS

CROSS-REFERENCE TO RELATED APPLICATION

This application is a continuation of International Application No. PCT/CN2020/071543, filed on Jan. 10, 2020, which claims priority to Chinese Patent Application No. 201910027928.1, filed on Jan. 11, 2019. The disclosures of the aforementioned applications are hereby incorporated by reference in their entireties.

TECHNICAL FIELD

This application relates to the field of communications technologies, and in particular, to a communication method and apparatus.

BACKGROUND

A terminal device monitors a physical downlink control channel (PDCCH). The PDCCH can be used to indicate a time-frequency resource of a physical downlink shared channel (PDSCH), and the like. However, statistics show that, in an existing long term evolution (LTE) network, no indication is detected for most of PDCCH monitoring performed by the terminal device, and the PDCCH monitoring without any indication contributes to considerable power consumption of the terminal device. Therefore, how to reduce power consumption of the terminal device needs to be considered. A direction for reducing the power consumption of the terminal device is how to reduce physical downlink control channel monitoring (PDCCH monitoring) without excessively affecting scheduling, for example, increasing a scheduling delay excessively.

Currently, a technology for reducing PDCCH monitoring is dynamically indicating a terminal device to skip PDCCH monitoring, which is also referred to as a go-to-sleep (GTS) technology. In other words, a GTS signal or GTS signaling is used to indicate the terminal device to skip PDCCH monitoring for a period of time.

However, after the GTS technology is used, there is a problem that a delay in some data scheduling increases.

SUMMARY

This application provides a communication method and apparatus, to reduce a delay in some data scheduling while reducing power consumption of a terminal device.

According to a first aspect, a communication method is provided. In the method, a terminal device sends first information to a network device within a sleep time period. The first information may be a scheduling request or a negative acknowledgment NACK. After sending the first information, the terminal device monitors a physical downlink control channel PDCCH within a first time period of the sleep time period.

Optionally, it may be that the terminal device in a sleep state sends the first information.

According to a second aspect, a communication method is provided. In the method, a network device sends sleep indication information to a terminal device. The sleep indication information may indicate the terminal device to enter a sleep state. Further, after sending the sleep indication information to the terminal device, and when being within a sleep time period, the network device receives first information from the terminal device. The network device further sends, to the terminal device, a first physical downlink control channel PDCCH corresponding to the first information.

In this aspect, when the terminal device in the sleep state needs to send a scheduling request or a NACK, the terminal device may enter a wake-up state. In this case, the terminal device can receive, within the sleep time period, a physical downlink control channel that schedules a resource for the scheduling request or the NACK, without waiting for the sleep time period to end before receiving the physical downlink control channel. Therefore, while power consumption of the terminal device is reduced, it is ensured that the physical downlink control channel corresponding to the scheduling request or the physical downlink control channel corresponding to retransmission scheduling of downlink data that is corresponding to the NACK is received as early as possible, thereby reducing a delay of the physical downlink control channel.

In one implementation, the first time period may be a time period starting from a symbol next to the last symbol occupied by the first information to an end of the sleep time period, a time period starting from a slot next to a slot occupied by the first information to an end of the sleep time period, a time period starting from a symbol next to the last symbol occupied by the first information to a time that is within the sleep time period and at which the terminal device detects the first PDCCH from the network device, or a time period starting from a slot next to a slot occupied by the first information to the time that is within the sleep time period and at which the first PDCCH from the network device is detected.

In this implementation, after sending the first information and until the entire sleep time period ends, the terminal device enters the wake-up state, and does not re-enter the sleep state anymore. This can ensure that data scheduling is not delayed. Alternatively, after the terminal device sends the first information, if the terminal device receives a data scheduling indication from the network device within the sleep time period, the terminal device re-enters the sleep state, to reduce power consumption of the terminal device.

In another implementation, the first information may be a NACK, and the first time period may be a time period starting from an end of a third time period to an end of the sleep time period, where the third time period is a time period starting from an end of the last symbol in which the NACK is sent. A length of the third time period is semi-statically configured by using radio resource control RRC signaling, and each downlink HARQ process may have a corresponding third time period timer. A possible name of the third time period is HARQ round trip time.

In still another implementation, the first information may be a scheduling request, and the first time period may be a time period starting from an end of a fourth time period to a time that is within the sleep time period and at which the terminal device detects the first PDCCH from the network device, where the fourth time period is a time period starting from an end of the last symbol in which the scheduling request is sent. A length of the fourth time period is semi-statically configured by using RRC signaling. A possible name of the fourth time period is scheduling request round trip time.

In still another implementation, the first information may be the NACK, and the NACK is corresponding to a first hybrid automatic repeat request HARQ process. The first time period may be a time period starting from a time at which a downlink retransmission timer is enabled to the end of the sleep time period, a timing period of the downlink retransmission timer, or a time period starting from a time at which a downlink retransmission timer is enabled to a time at which the first PDCCH from the network device is detected.

In this implementation, when discontinuous reception is configured for the terminal device, the first time period starts from the time at which the downlink retransmission timer is enabled, to the end of the sleep time period. The terminal device enters the wake-up state, and does not re-enter the sleep state anymore, which can ensure that data scheduling is not delayed. Alternatively, when discontinuous reception is configured for the terminal device, the first time period starts from the time at which the downlink retransmission timer is enabled. If within the sleep time period, the terminal device receives a data scheduling indication from the network device, or the downlink retransmission timer stops, the terminal device re-enters the sleep state, to reduce power consumption of the terminal device.

In still another implementation, the first information may be the NACK, the NACK corresponds to a first HARQ process, and the first PDCCH carries a retransmission scheduling indication of the first HARQ process. Before the terminal device sends the first information to the network device, the method further includes: The terminal device receives a second PDCCH used to schedule a physical downlink shared channel (PDSCH), where the PDSCH is corresponding to the first HARQ process. Further, that the terminal device sends the first information to the network device includes: When the terminal device fails to decode the PDSCH, the terminal device sends the NACK to the network device.

This implementation is applied to a retransmission scheduling scenario. In this scenario, the terminal device wakes up in time, and sends the NACK to the network device, thereby ensuring timely scheduling.

In still another implementation, the terminal device is in the sleep state within a second time period before the downlink retransmission timer is enabled, where the second time period is a timing period of a downlink HARQ round trip time timer, and the downlink retransmission timer and the downlink HARQ round trip time timer are corresponding to the first HARQ process.

In this implementation, the terminal device is in the sleep state within the second time period before the downlink retransmission timer is enabled, so that power consumption of the terminal device can be reduced as much as possible.

In still another implementation, the sleep time period is greater than or equal to a threshold.

In this implementation, the foregoing solutions are implemented when the sleep time period is greater than or equal to the threshold. For a longer sleep time period, frequent sending of sleep indication information can be avoided, thereby reducing resource overheads used for sending the sleep indication information. However, a longer sleep time period causes a longer scheduling delay. The foregoing solutions avoid an impact of a longer scheduling delay on the scheduling request and downlink retransmission.

In still another implementation, before the terminal device sends the first information to the network device within the sleep time period, the method further includes: The terminal device receives sleep indication information from the network device, where the sleep indication information is used to indicate the terminal device to enter the sleep state.

In this implementation, the terminal device enters the sleep state when the terminal device does not perform data scheduling, so that power consumption of the terminal device can be reduced.

In still another implementation, the method further includes: After receiving the sleep indication information from the network device, the terminal device enables a sleep timer, where a length of a timing period of the sleep timer may be equal to a length of the sleep time period.

In this implementation, when the terminal device starts to enter the sleep state, a timer is used to time the sleep time period.

In still another implementation, the method further includes: The terminal device sends the first information to the network device, and disables the sleep timer.

In this implementation, after sending the first information, the terminal device disables the sleep timer, and the terminal device enters the wake-up state.

In still another implementation, if an end moment of the first time period is before an end moment of the sleep time period, the terminal device is in the sleep state from the end moment of the first time period to the end moment of the sleep time period.

In this implementation, when the terminal device does not perform data scheduling within the sleep time period, the terminal device enters the sleep state, so that power consumption of the terminal device can be reduced.

In still another implementation, that the network device sends, to the terminal device, the first PDCCH corresponding to the first information includes: The network device sends the first PDCCH to the terminal device within the sleep time period, or the network device sends the first PDCCH to the terminal device after the sleep time period.

In still another implementation, the first information is the NACK, the NACK is corresponding to a first HARQ process, and the first PDCCH carries a retransmission scheduling indication of the first HARQ process. Before the network device receives the first information from the terminal device, the method further includes: The network device sends, to the terminal device, a second PDCCH used to schedule a PDSCH, where the PDSCH is corresponding to the first HARQ process. Further, that the network device receives the first information from the terminal device includes: When the terminal device fails to decode the PDSCH, the network device receives the NACK from the terminal device.

According to a third aspect, a communication apparatus is provided, and can implement the communication method in any one of the first aspect or the possible implementations of the first aspect. For example, the communication apparatus may be a chip (for example, a communication chip) or a terminal device, and may implement the foregoing method by using software, hardware, or hardware executing corresponding software.

In a possible implementation, a structure of the communication apparatus includes a processor and a memory. The processor is configured to support the apparatus in performing a corresponding function in the foregoing communication method. The memory is configured to be coupled to the processor, and the memory stores programs (instructions) and/or data necessary for the apparatus. Optionally, the communication apparatus may further include a communication interface configured to support communication between the apparatus and another network element.

In another possible implementation, the communication apparatus may include a unit or a module that performs a corresponding action in the foregoing method.

The apparatus includes:

a transceiver unit, configured to send first information to a network device within a sleep time period, where the first information is a scheduling request or a negative acknowledgment (NACK); and a processing unit, configured to: after the transceiver unit sends the first information, monitor a physical downlink control channel (PDCCH) within a first time period of the sleep time period.

In still another possible implementation, the apparatus includes a processor and a transceiver, where the processor is coupled to the transceiver. The processor is configured to execute computer programs or instructions, to control the transceiver to receive and send information. When the processor executes the computer programs or instructions, the processor is further configured to implement the foregoing method. The transceiver may be a transceiver, a transceiver circuit, or an input/output interface. When the communication apparatus is a chip, the transceiver is a transceiver circuit or an input/output interface.

In still another possible implementation, a structure of the communication apparatus includes a processor. The processor is configured to support the apparatus in performing a corresponding function in the foregoing communication method. The communication apparatus may be a chip system, or may be a terminal device or a network device.

In still another possible implementation, a structure of the communication apparatus includes a processor, and the processor is configured to be coupled to a memory, read instructions in the memory, and implement the foregoing method according to the instructions.

In still another possible implementation, a structure of the communication apparatus includes a transceiver, configured to implement the foregoing communication method.

When the communication apparatus is a chip, the transceiver may be an input/output unit, for example, an input/output circuit or a communication interface. When the communication apparatus is user equipment, the transceiver may be a transmitter/receiver machine or a transmitter/receiver.

According to a fourth aspect, a communication apparatus is provided, and can implement the communication method in any one of the second aspect or the possible implementations of the second aspect. For example, the communication apparatus may be a chip (for example, a baseband chip or a communication chip) or a network device, and may implement the foregoing method by using software, hardware, or hardware executing corresponding software.

In a possible implementation, a structure of the communication apparatus includes a processor and a memory. The processor is configured to support the apparatus in performing a corresponding function in the foregoing communication method. The memory is configured to be coupled to the processor, and the memory stores programs (instructions) and/or data necessary for the apparatus. Optionally, the communication apparatus may further include a communication interface configured to support communication between the apparatus and another network element.

In another possible implementation, the communication apparatus may include a unit or a module that performs a corresponding action in the foregoing method.

The apparatus includes:

a transceiver unit, configured to send sleep indication information to a terminal device, where the sleep indication information is used to indicate the terminal device to enter a sleep state;

the transceiver unit is further configured to: after the transceiver sends the sleep indication information to the terminal device, and when the terminal device is within a sleep time period, receive first information from the terminal device; and the transceiver unit is further configured to send, to the terminal device, a first physical downlink control channel (PDCCH) corresponding to the first information.

In still another possible implementation, the apparatus includes a processor and a transceiver, where the processor is coupled to the transceiver. The processor is configured to execute computer programs or instructions, to control the transceiver to receive and send information. When the processor executes the computer programs or instructions, the processor is further configured to implement the foregoing method. The transceiver may be a transceiver, a transceiver circuit, or an input/output interface. When the communication apparatus is a chip, the transceiver is a transceiver circuit or an input/output interface.

In still another possible implementation, a structure of the communication apparatus includes a processor. The processor is configured to support the apparatus in performing a corresponding function in the foregoing communication method.

In still another possible implementation, a structure of the communication apparatus includes a processor, and the processor is configured to be coupled to a memory, read instructions in the memory, and implement the foregoing method according to the instructions.

In still another possible implementation, a structure of the communication apparatus includes a transceiver, configured to implement the foregoing communication method.

When the communication apparatus is a chip, the transceiver may be an input/output unit, for example, an input/output circuit or a communication interface. When the communication apparatus is a network device, the transceiver may be a transmitter/receiver (which may also be referred to as a transmitter/receiver).

According to a fifth aspect, a computer-readable storage medium is provided, where the computer-readable storage medium stores computer programs or instructions; and when the computer programs or the instructions are executed, the method according to the first aspect or the second aspect is implemented.

According to a sixth aspect, a computer program product including instructions is provided. When the instructions are run on a computer, the computer is enabled to perform the method according to the first aspect or the second aspect.

According to a seventh aspect, a communication system is provided, including the communication apparatuses in the third aspect and the fourth aspect.

DESCRIPTION OF EMBODIMENTS

The following describes the embodiments of this application with reference to the accompanying drawings in the embodiments of this application.

Figure 1:
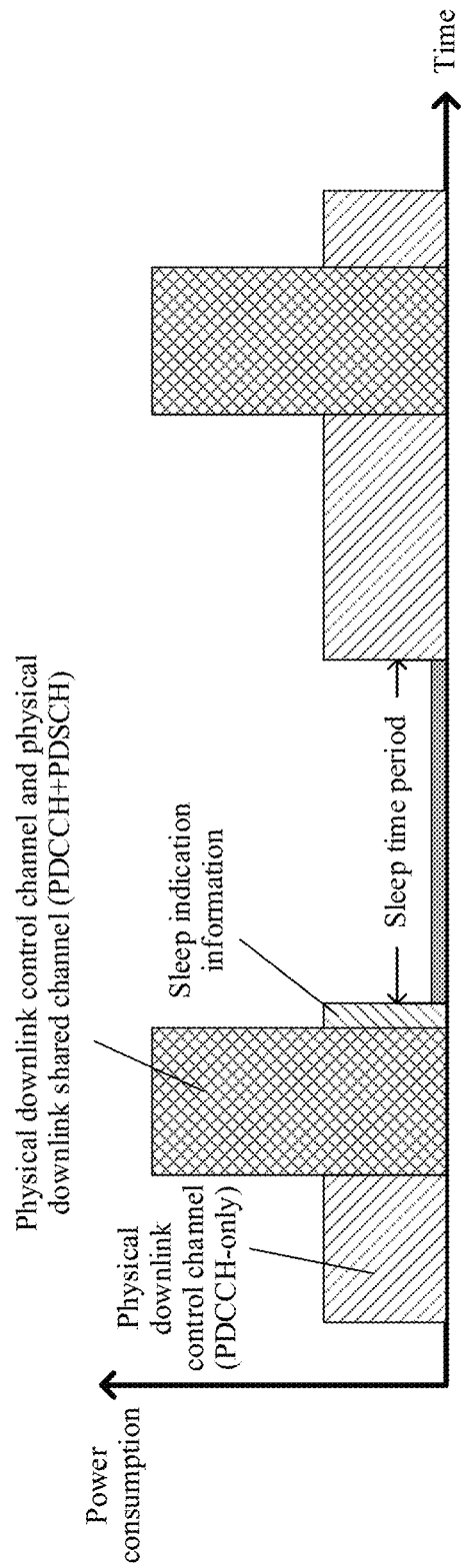
FIG. 1 shows an example of reducing power consumption of a terminal device by using a GTS technology.

FIG. 1 shows an example of reducing power consumption of a terminal device by using a GTS technology. A base station (for example, a gNB) indicates, by using signaling or a physical layer signal (for example, a GTS signal or GTS signaling), the terminal device to skip PDCCH monitoring for a time period that is a go-to-sleep duration (GTS duration). For example, the GTS signal may be sent by using a PDCCH in a specific format, for example, an existing downlink control information (downlink control information, DCI) format or a new DCI format, or by using a newly designed physical layer signal or channel. The GTS duration may be predefined in a protocol, or semi-statically configured by the gNB for the terminal device, and may have one or more values (for one value, the GTS signal needs to carry only one bit of indication information, and for more values, the GTS needs to carry more than one bit of indication information). After receiving the GTS signal, the terminal device skips, according to the indication, PDCCH monitoring for the time period that is the GTS duration. By using the technology, power consumption reduced for the terminal device is a difference between power consumption caused when PDCCH monitoring is not performed within the GTS duration and power consumption caused when PDCCH monitoring is performed within the GTS duration.

In FIG. 1, a "PDCCH-only" state is a state in which the terminal device performs PDCCH monitoring but does not detect any grant, and corresponding power consumption is mainly power consumption caused by PDCCH monitoring; a "PDCCH+PDSCH" state indicates that the terminal device detects downlink data (PDSCH), and corresponding power consumption includes power consumption caused by PDCCH monitoring and power consumption caused by PDSCH receiving; and a "GTS signal" state indicates that the terminal device detects the GTS signal sent by the gNB, and then the terminal device skips, according to the indication, PDCCH monitoring for the GTS duration. Therefore, power consumption is comparatively low within the GTS duration. It is generally considered that power consumption caused by GTS signal detection is not higher than power consumption caused by PDCCH detection.

Figure 2:
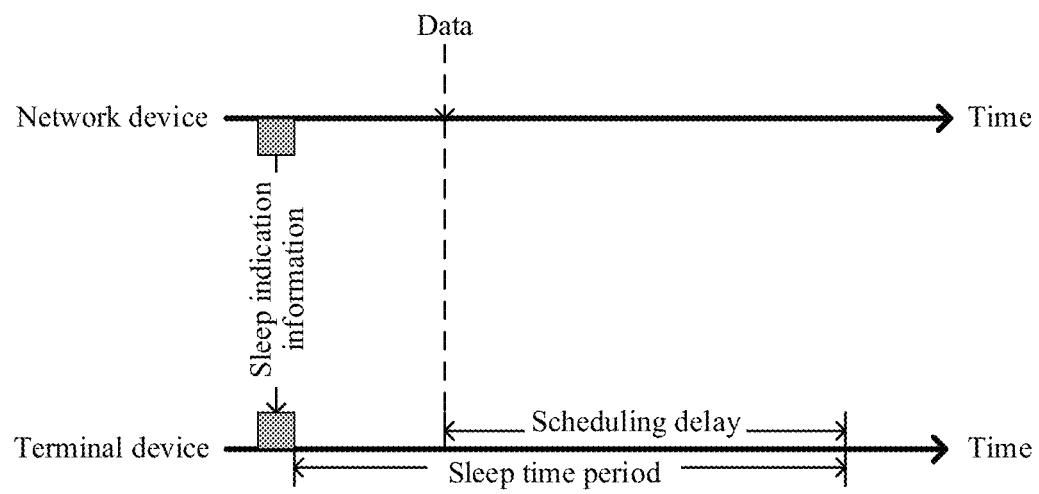
FIG. 2 is a schematic diagram of generation of a scheduling delay occurring when a network device needs to perform data scheduling on a terminal device within a sleep time period.

An L1 dynamic indication of GTS increases a scheduling delay while reducing power consumption of the terminal device. As shown in FIG. 2, if downlink or uplink data needs to be scheduled within the GTS duration, scheduling can be performed only after the indicated GTS duration ends. Therefore, a maximum scheduling delay may be the GTS duration. Usually, a longer GTS duration brings about larger reduction of power consumption but correspondingly a longer scheduling delay. Therefore, if the GTS duration is set to a longer time period for more power consumption reduction gains, a longer scheduling delay may be caused. However, if the GTS duration is reduced according to a low scheduling delay requirement, power consumption reduction becomes smaller (that is, at the expense of a power consumption reduction gain), and resource overheads used for sending a GTS signal may increase because a GTS signal needs to be sent more frequently.

Embodiments of this application provide a communication method and apparatus. When a terminal device needs to send a scheduling request or a NACK, the terminal device may receive, within a sleep time period, a physical downlink control channel that schedules a resource for the scheduling request or the NACK, without waiting for the sleep time period to end before receiving the physical downlink control channel. Therefore, while power consumption of the terminal device is reduced, it is ensured that the physical downlink control channel corresponding to the scheduling request or the physical downlink control channel corresponding to retransmission scheduling of downlink data that is corresponding to the NACK is received as early as possible, thereby reducing a delay of the physical downlink control channel.

Figure 3:
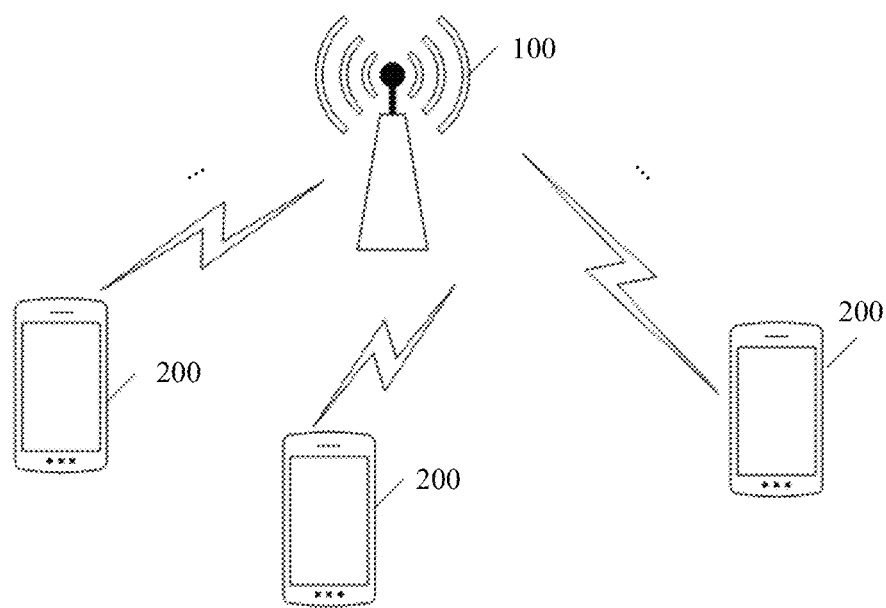
FIG. 3 is a schematic diagram of a communication system according to this application.

FIG. 3 is a schematic diagram of a communication system according to this application. The communication system may include at least one network device 100 (only one network device 100 is shown) and one or more terminal devices 200 connected to the network device 100.

The network device 100 may be a device that can communicate with the terminal device 200. The network device 100 may be any device with a wireless transceiver function, including but not limited to a base station NodeB, an evolved base station eNodeB, a base station in a fifth generation (5G) communication system, a base station or a network device in a future communication system, an access node in a Wi-Fi system, a wireless relay node, or a wireless backhaul node. The network device 100 may alternatively be a radio controller in a cloud radio access network (CRAN) scenario. The network device 100 may alternatively be a small cell, a transmission reception point (TRP), or the like. A specific technology and a specific device form used by the network device are not limited in the embodiments of this application.

The terminal device 200 is a device with a wireless transceiver function, and may be deployed on land, including an indoor or outdoor device, a handheld device, a wearable device, or a vehicle-mounted device. It may also be deployed on the water, for example, on a ship. It may further be deployed in the air, for example, in an airplane, a balloon, and a satellite. The terminal device may be a mobile phone, a tablet computer (pad), a computer with a wireless transceiver function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. The terminal device sometimes may be referred to as user equipment (UE), an access terminal device, a UE unit, a mobile station, a mobile console, a remote station, a remote terminal device, a mobile device, a terminal, a wireless communication device, a UE agent, a UE apparatus, or the like.

It should be noted that the terms "system" and "network" may be used interchangeably in the embodiments of this application. "A plurality of" means two or more. In view of this, "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects.

A sleep state may indicate that a type of PDCCH that a terminal device in the sleep state does not need to monitor includes at least one of the following types:

a PDCCH corresponding to a cell-RNTI (C-RNTI), a PDCCH corresponding to a configured scheduling-RNTI (CS-RNTI), a PDCCH corresponding to an interruption-RNTI (INT-RNTI), a PDCCH corresponding to a slot format indication-RNTI (SFI-RNTI), a PDCCH corresponding to a semi-permanent channel state information RNTI (SP-CSI-RNTI), a PDCCH corresponding to a transmit power control-PUCCH-RNTI (TPC-PUCCH-RNTI), a PDCCH corresponding to a transmit power control-PUSCH-RNTI (TPC-PUSCH-RNTI), and a PDCCH corresponding to a transmit power control-sounding reference signal-RNTI (TPC-SRS-RNTI).

In the foregoing, a PDCCH corresponding to an RNTI may indicate that a cyclic redundancy check (CRC) bit of DCI carried by the PDCCH is scrambled by using the RNTI.

The terminal device in the sleep state does not monitor at least one of the foregoing types of PDCCHs, but may monitor another type of PDCCH. Alternatively, the terminal device in the sleep state may monitor none of the foregoing types of PDCCHs, but may monitor another type of PDCCH. Alternatively, the terminal device in the sleep state may not monitor any PDCCH.

The sleep state further includes that the terminal device in the sleep state does not perform PDSCH receiving.

A wake-up state indicates that a terminal device is in the wake-up state when the terminal device is not in the sleep state.

Figure 4:
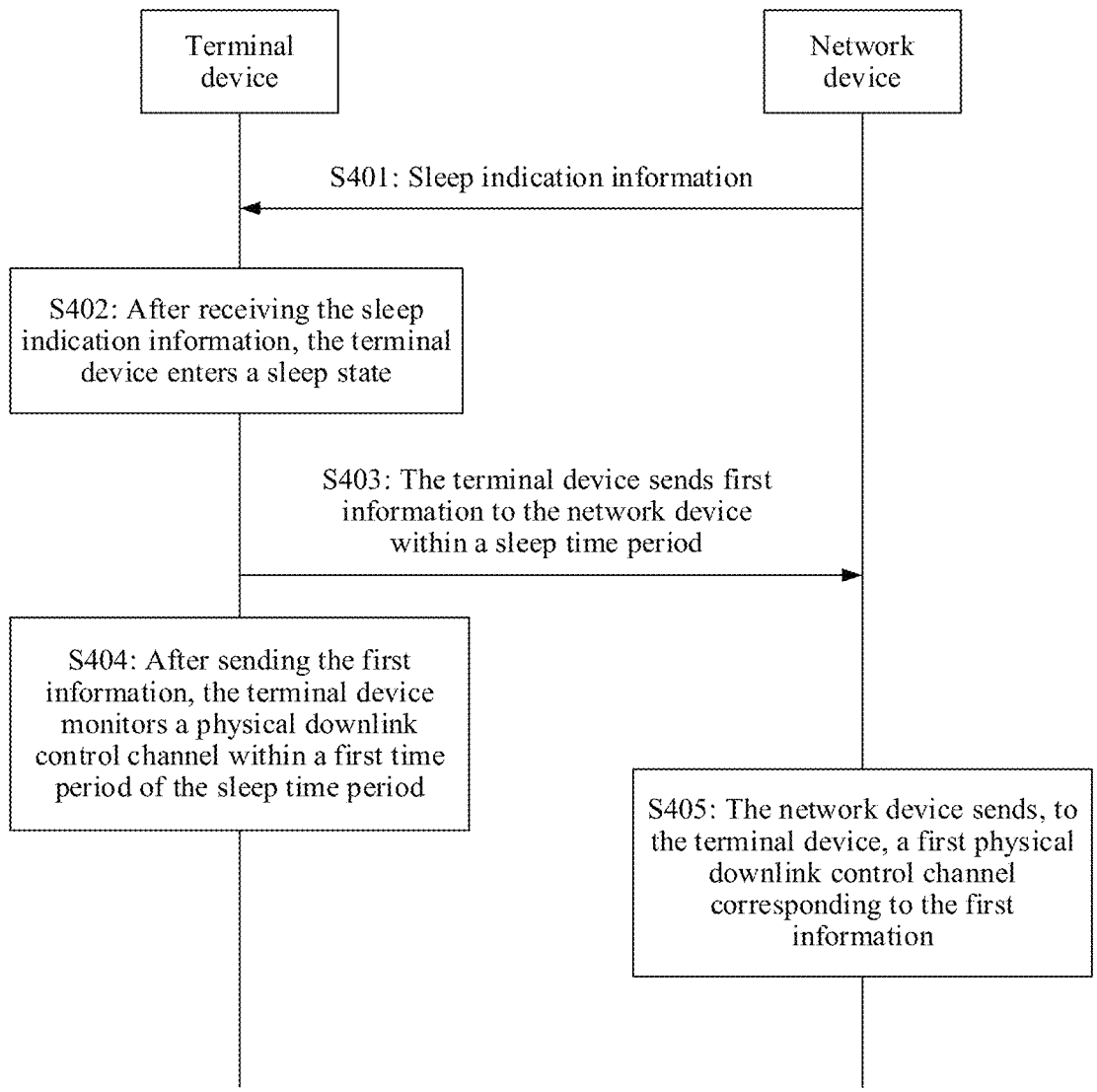
FIG. 4 is a schematic flowchart of a communication method according to an embodiment of this application.

FIG. 4 is a schematic flowchart of a communication method according to an embodiment of this application. The communication method may be applied to the foregoing communication system and includes the following steps.

S401: A network device sends sleep indication information to a terminal device, and the terminal device receives the sleep indication information.

The sleep indication information may indicate the terminal device to enter a sleep state.

Optionally, the sleep indication information may be a GTS signal, or the sleep indication information is a signal carried in GTS signaling.

Optionally, the sleep indication information includes indication information of a sleep time period, and the indication information is used to indicate the terminal device to enter the sleep state within the sleep time period. In this embodiment, the sleep time period may be a GTS duration. In specific implementation, the network device sends a radio resource control (RRC) message to the terminal device, or certainly may send another message to the terminal device. The RRC message includes one or more GTS durations, so that the one or more GTS durations may be configured for the terminal device by using the RRC message. Optionally, the one or more GTS durations may be a quantity of slots, a quantity of symbols, or a combination thereof, or may be an absolute time length (for example, millisecond). The foregoing indication information may indicate one of the GTS durations. A gNB sends a GTS signal or GTS signaling to UE, to indicate the UE not to perform monitoring of the foregoing types of PDCCHs (referred to as "not perform PDCCH monitoring" or "not monitor a PDCCH" for short below) within one of the configured GTS durations. The UE receives the GTS signal or GTS signaling, and does not monitor a PDCCH, starting from a symbol next to the last symbol in which the GTS signal or GTS signaling is received, or starting from a slot next to a slot in which the GTS signal or GTS signaling is received.

S402: After receiving the sleep indication information, the terminal device enters the sleep state.

After the terminal device enters the sleep state, power consumption is comparatively low, and therefore power consumption of the terminal device can be reduced.

In this application, after entering the sleep state, the terminal device may not receive other information or data other than a PDCCH from the network device; or after entering the sleep state, the terminal device may also receive any information or data from the network device. This is not limited herein.

S403: The terminal device sends first information to the network device within the sleep time period. The first information may be a scheduling request (scheduling request, SR) or a negative acknowledgment (negative acknowledgment, NACK).

Correspondingly, when the terminal device is within the sleep time period, the network device receives the first information from the terminal device.

For example, in one scenario, before the terminal device receives the sleep indication information, the network device sends a physical downlink shared channel (physical downlink shared channel, PDSCH) to the terminal device. Then, the terminal device receives the sleep indication information and enters the sleep state; or the terminal device receives the sleep indication information, enters the sleep state, and attempts to receives the PDSCH. However, the terminal device fails to receive or decode the PDSCH, and the terminal device needs to send a NACK to the network device. For another example, in another scenario, the terminal device needs to send a physical uplink shared channel (physical uplink shared channel, PUSCH) to the network device. Before the PUSCH is sent, the network device needs to perform scheduling, and therefore the terminal device needs to send an SR to the network device. After the terminal device enters the sleep state, that is, when the terminal device is still within the sleep time period, the terminal device enters a wake-up state, and sends the first information to the network device. The first information is the SR or NACK.

S404: After sending the first information, the terminal device monitors a physical downlink control channel within a first time period of the sleep time period.

After sending the first information, the terminal device needs to receive scheduling information of the network device, that is, needs to monitor a PDCCH. Specifically, after sending the first information, the terminal device monitors a PDCCH within the first time period of the sleep time period.

For example, in the foregoing retransmission scenario, the gNB sends a PDCCH (DL grant) to the UE, where the PDCCH indicates a time-frequency resource of the PDSCH, a corresponding HARQ process ID, and a PUCCH resource used for feeding back a HARQ-ACK corresponding to the PDSCH. For another example, in the foregoing SR sending scenario, the gNB sends a PDCCH to the UE, where the PDCCH includes feedback information of the scheduling request.

S405: The network device sends, to the terminal device, a first PDCCH corresponding to the first information.

Optionally, after receiving the first information sent by the terminal device, the network device may send the first PDCCH to the terminal device within the sleep time period, or send the first PDCCH to the terminal device after the sleep time period. In this way, the network device can send, within the sleep time period, the physical downlink control channel that schedules a resource for the scheduling request or the NACK, without waiting for the sleep time period to end before sending the physical downlink control channel. Therefore, while power consumption of the terminal device is reduced, it is ensured that the physical downlink control channel corresponding to the scheduling request or the physical downlink control channel corresponding to retransmission scheduling of downlink data that is corresponding to the NACK is received as early as possible, thereby reducing a delay in sending the physical downlink control channel.

In an implementation, the first time period is:

a time period starting from a symbol next to the last symbol occupied by the first information to an end of the sleep time period;

a time period starting from a slot next to a slot occupied by the first information to an end of the sleep time period;

a time period starting from a symbol next to the last symbol occupied by the first information to a time that is within the sleep time period and at which the first PDCCH from the network device is detected; or a time period starting from a slot next to a slot occupied by the first information to a time that is within the sleep time period and at which the first PDCCH from the network device is detected.

Optionally, the first PDCCH carries a retransmission scheduling indication of a first HARQ process. Optionally, the terminal device may detect the first PDCCH within the sleep time period, or may detect the first PDCCH after the sleep time period ends.

In this embodiment of this application, the time at which the first PDCCH is detected may be a time at which a PDCCH candidate is successfully decoded. If the first time period in the foregoing embodiment ends when the first PDCCH from the network device is detected, this case may mean that the first time period ends when the first PDCCH is successfully decoded. The same applies to a case in which a time period ends when a PDCCH from a network device is detected in a subsequent embodiment.

Optionally, the terminal device may detect, within the first time period, a PDCCH that schedules a resource for another request.

In this implementation, after sending the first information and until the entire sleep time period ends, the terminal device may enter the wake-up state, and does not re-enter the sleep state anymore. This can ensure that data scheduling is not delayed. Alternatively, after the terminal device sends the first information, if the terminal device receives a data scheduling indication from the network device within the sleep time period, the terminal device re-enters the sleep state, to reduce power consumption of the terminal device.

In another implementation, when discontinuous reception (discontinuous reception, DRX) is configured for the terminal device, the first information is the NACK, and the first time period is:

a time period starting from a time at which a downlink retransmission timer is enabled to the end of the sleep time period;

a timing period of the downlink retransmission timer; or a time period starting from a time at which a downlink retransmission timer is enabled to a time at which the first PDCCH from the network device is detected.

In this implementation, when discontinuous reception is configured for the terminal device, the first time period starts from the time at which the downlink retransmission timer is enabled, to the end of the sleep time period. The terminal device enters the wake-up state, and does not re-enter the sleep state anymore, which can ensure that data scheduling is not delayed. Alternatively, when discontinuous reception is configured for the terminal device, the first time period starts from the time at which the downlink retransmission timer is enabled. If within the sleep time period, the terminal device receives a data scheduling indication from the network device, or the downlink retransmission timer stops, the terminal device re-enters the sleep state, to reduce power consumption of the terminal device.

Optionally, the method further includes: Within the sleep time period and before the first information is sent, the terminal device is in the sleep state. In this way, power consumption of the terminal device can be reduced.

According to the communication method provided in this embodiment of this application, when the terminal device in the sleep state needs to send a scheduling request or a NACK, the terminal device may receive, within the sleep time period, a physical downlink control channel that schedules a resource for the scheduling request or the NACK, without waiting for the sleep time period to end before receiving the physical downlink control channel. Therefore, while power consumption of the terminal device is reduced, it is ensured that the physical downlink control channel corresponding to the scheduling request or the physical downlink control channel corresponding to retransmission scheduling of downlink data that is corresponding to the NACK is received as early as possible, thereby reducing a delay of the physical downlink control channel.

Specifically, the method shown in the foregoing embodiment may be applied to the following several scenarios.

(1) PDSCH retransmission scheduling based on a hybrid automatic repeat request (hybrid automatic repeat request, HARQ)

(2) PUSCH scheduling in a case of SR pending

In the (1) scenario, if the terminal device fails to receive or decode a PDSCH, the terminal device needs to send a NACK to the network device. In the (2) scenario, if the terminal device needs to send a PUSCH to the network device, the terminal device needs to send an SR to the network device.

In this embodiment of this application, a GTS rule that is different from a conventional one is specified. In summary, when waiting for the two types of scheduling, the terminal device may break a rule of "skipping PDCCH monitoring for a GTS duration" that applies when a GTS signal or signaling indication is detected, and still perform PDCCH monitoring.

The following further describes in detail the communication method shown in the foregoing embodiment based on a specific data scheduling scenario.

Figure 5:
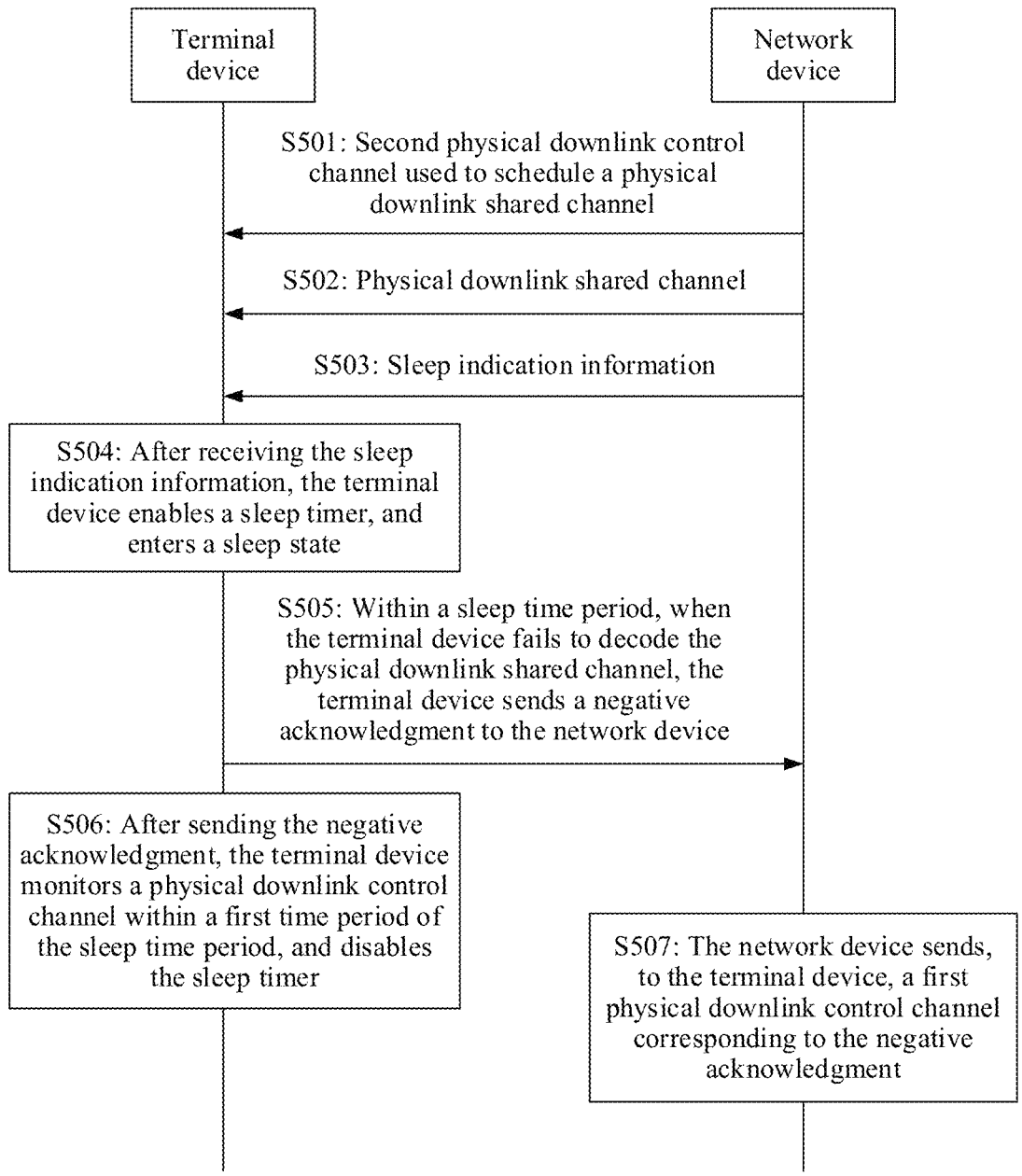
FIG. 5 is a schematic flowchart of another communication method according to an embodiment of this application.

FIG. 5 is a schematic flowchart of another communication method according to an embodiment of this application. The communication method includes the following steps.

S501: A network device sends, to a terminal device, a second PDCCH used to schedule a PDSCH, where the PDSCH is corresponding to a first HARQ process.

Correspondingly, the terminal device receives the second PDCCH used to schedule the PDSCH.

The network device sends the second PDCCH to the terminal device, where the second PDCCH is used to schedule the PDSCH.

Optionally, the network device further sends an RRC message to the terminal device, to configure, for the terminal device, a PDSCH time domain resource parameter and a PUCCH resource used for feeding back a HARQ-ACK corresponding to the PDSCH.

The network device sends the PDSCH to the terminal device on an indicated PDSCH time domain resource.

S502: The network device sends the PDSCH to the terminal device.

Correspondingly, the terminal device receives the PDSCH.

S503: The network device sends sleep indication information to the terminal device. The terminal device receives the sleep indication information.

The sleep indication information may indicate the terminal device to enter a sleep state.

The network device indicates, by using a GTS signal or GTS signaling, the terminal device not to perform PDCCH monitoring for a time period that is a GTS duration, that is, indicates the terminal device to enter the sleep state. The terminal device enters the sleep state. For specific implementation of this step, refer to step S401 in the embodiment shown in FIG. 4. Details are not described herein again.

It should be noted that a sequence of S502 and S503 is not limited. That is, the network device may send the PDSCH before sending the sleep indication information, or may send the PDSCH after sending the sleep indication information.

S504: After receiving the sleep indication information, the terminal device enables a sleep timer, and enters the sleep state.

The terminal device times a sleep time period by using a sleep timer, that is, a length of a timing period of the sleep timer is equal to a length of the sleep time period.

S505: Within the sleep time period, when the terminal device fails to decode the PDSCH, the terminal device sends a NACK to the network device.

Correspondingly, the network device receives the NACK. The NACK is corresponding to the first HARQ process.

The terminal device receives and decodes the PDSCH. If the UE receives and correctly decodes the PDSCH, the UE feeds back an ACK on the PUCCH resource that is indicated by the PDCCH and that is used for feeding back the HARQ-ACK, and does not monitor a PDCCH until the GTS duration ends. Optionally, the terminal device may feed back the ACK after the GTS duration ends.

After the terminal device receives the GTS signal or GTS signaling, if an error occurs in decoding of a PDSCH corresponding to any process (for example, the first HARQ process) in downlink HARQ processes (that is, the decoding cannot pass a cyclic redundancy check (CRC) of the PDSCH), and the terminal device does not receive a retransmission scheduling indication, the terminal device may not comply with a GTS indication after feeding back a NACK.

Specifically, PDCCH monitoring may be performed in the following several implementations.

Figure 6:
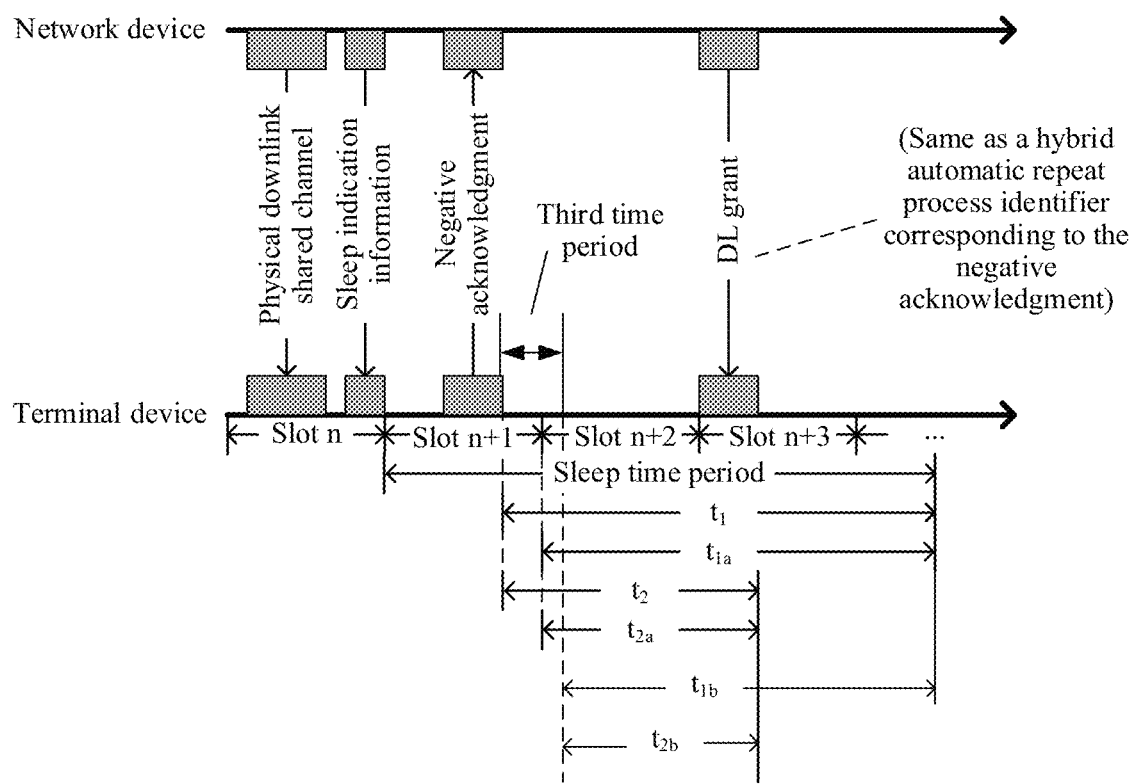
FIG. 6 is a schematic diagram of a terminal device sending a NACK after the terminal device enters a sleep state.

In an implementation, as shown in FIG. 6 that is a schematic diagram of a terminal device sending a NACK after the terminal device enters a sleep state, the terminal device performs PDCCH monitoring, starting from a symbol next to the last symbol occupied by the NACK ($t_1$ shown in FIG. 6), starting from a slot next to a slot occupied by the NACK ($t_{1a}$ shown in FIG. 6), or starting from an end of a third time period ($t_{1b}$ shown in FIG. 6), until the GTS duration ends. The third time period starts from an end of the last symbol in which the NACK is sent. A length of the third time period is semi-statically configured by using RRC signaling, and each downlink HARQ process may have its own corresponding third time period timer. A possible name of the third time period is HARQ round trip time.

In another implementation, as shown in FIG. 6, the terminal device performs PDCCH monitoring, starting from a symbol next to the last symbol occupied by the NACK ($t_2$ shown in FIG. 6), starting from a slot next to a slot occupied by the NACK ($t_{2a}$ shown in FIG. 6), or starting from an end of a third time period ($t_{2b}$ shown in FIG. 6), until a first PDCCH for the first HARQ process corresponding to the NACK is detected. The first PDCCH carries a retransmission scheduling indication of the first HARQ process.

S506: After sending the NACK, the terminal device monitors a physical downlink control channel within a first time period of the sleep time period.

Optionally, in this step, the terminal device may further disable the sleep timer.

After sending the NACK, the terminal device needs to monitor the first PDCCH within the first time period of the sleep time period.

When sending the NACK, the terminal device disables the sleep timer, and enters a wake-up state.

Optionally, when sending the NACK, the terminal device may alternatively not disable the sleep timer. In this case, the sleep timer times the entire sleep time period, and the terminal device enables another timer to time the first time period.

S507: The network device sends, to the terminal device, the first PDCCH corresponding to the NACK.

Optionally, after receiving first information sent by the terminal device, the network device may send the first PDCCH to the terminal device within the sleep time period, or send the first PDCCH to the terminal device after the sleep time period. Correspondingly, the network device can send, within the sleep time period, the physical downlink control channel that schedules a resource for the NACK, without waiting for the sleep time period to end before sending the physical downlink control channel. Therefore, while power consumption of the terminal device is reduced, it is ensured that the physical downlink control channel corresponding to retransmission scheduling of downlink data that is corresponding to the NACK is received as early as possible, thereby reducing a delay in sending the physical downlink control channel.

Optionally, the foregoing rule is valid when the GTS duration is greater than or equal to a first threshold. The first threshold may be preconfigured or predefined. That is, the foregoing solutions are implemented when the sleep time period is greater than or equal to the first threshold, so that frequent sending of sleep indication information can be avoided, thereby reducing resource overheads used for sending the sleep indication information.

That is, if the terminal device determines that the GTS duration is greater than or equal to the first threshold, after sending the NACK, the terminal device monitors a physical downlink control channel within the first time period of the sleep time period.

In a conventional technology, retransmission can be scheduled only after a GTS duration ends. Otherwise, UE cannot detect a PDCCH indicating retransmission. Therefore, a retransmission delay is comparatively long. In this embodiment, the gNB may schedule, within a "non-compliance with GTS" time range, PDSCH retransmission for a HARQ process that needs to be retransmitted, thereby reducing a retransmission delay.

Figure 7:
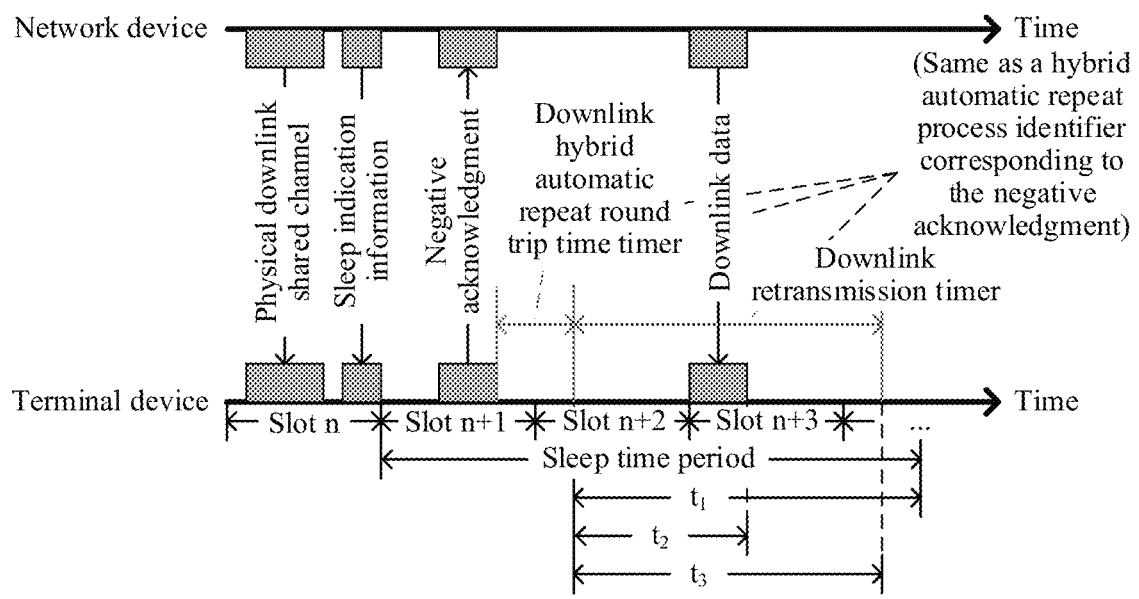
FIG. 7 is a schematic diagram of a terminal device, for which DRX is configured, sending a NACK after the terminal device enters a sleep state.

FIG. 7 is a schematic diagram of a terminal device, for which DRX is configured, sending a NACK after the terminal device enters a sleep state. Different from the embodiment shown in FIG. 5, DRX parameters are configured for the terminal device, and a first time period is a time period starting from a time at which a downlink retransmission timer is enabled to an end of a sleep time period, a timing period of the downlink retransmission timer, or a time period starting from a time at which the downlink retransmission timer is enabled to a time at which a first PDCCH from a network device is received.

Specifically, by sending an RRC message that carries an information element (IE), that is, DRX-Config, to UE, a gNB configures DRX parameters including a downlink HARQ round trip time timer (drx-HARQ-RTT-TimerDL) parameter and a downlink retransmission timer (drx-RetransmissionTimerDL) parameter for the UE. Optionally, if the gNB configures the DRX parameters for the UE, the gNB sends a PDCCH to the UE within DRX active time of the UE.

When the terminal device for which the DRX parameters are configured fails to receive or decode a PDSCH and after the terminal device sends a NACK, the terminal device may perform PDCCH monitoring in the following several implementations.

In an implementation, the terminal device performs PDCCH monitoring, starting from a time at which a downlink retransmission timer of a HARQ process corresponding to the NACK is enabled, until a GTS duration ends ($t_1$ shown in FIG. 7).

In another implementation, the terminal device performs PDCCH monitoring within a timing period of the downlink retransmission timer of the HARQ process corresponding to the NACK ($t_3$ shown in FIG. 7).

In still another implementation, the terminal device performs PDCCH monitoring, starting from the time at which the downlink retransmission timer of the HARQ process corresponding to the NACK is started to a time at which the first PDCCH for the HARQ process corresponding to the NACK ($t_2$ shown in FIG. 7) is detected.

In this embodiment, the downlink retransmission timer and a downlink HARQ round trip time timer are corresponding to the foregoing first HARQ process.

Optionally, the foregoing rule is valid when the GTS duration is greater than or equal to a second threshold. The second threshold may be preconfigured or predefined. That is, the foregoing solutions are implemented when the sleep time period is greater than or equal to the second threshold, so that frequent sending of sleep indication information can be avoided, thereby reducing resource overheads used for sending the sleep indication information.

In a conventional technology, retransmission can be scheduled only after a GTS duration ends. Otherwise, UE cannot detect a PDCCH indicating retransmission. Therefore, a retransmission delay is comparatively long. In this embodiment, the gNB may schedule, within a "non-compliance with GTS" time range, PDSCH retransmission for the HARQ process that needs to be retransmitted, thereby reducing a retransmission delay.

Figure 8:
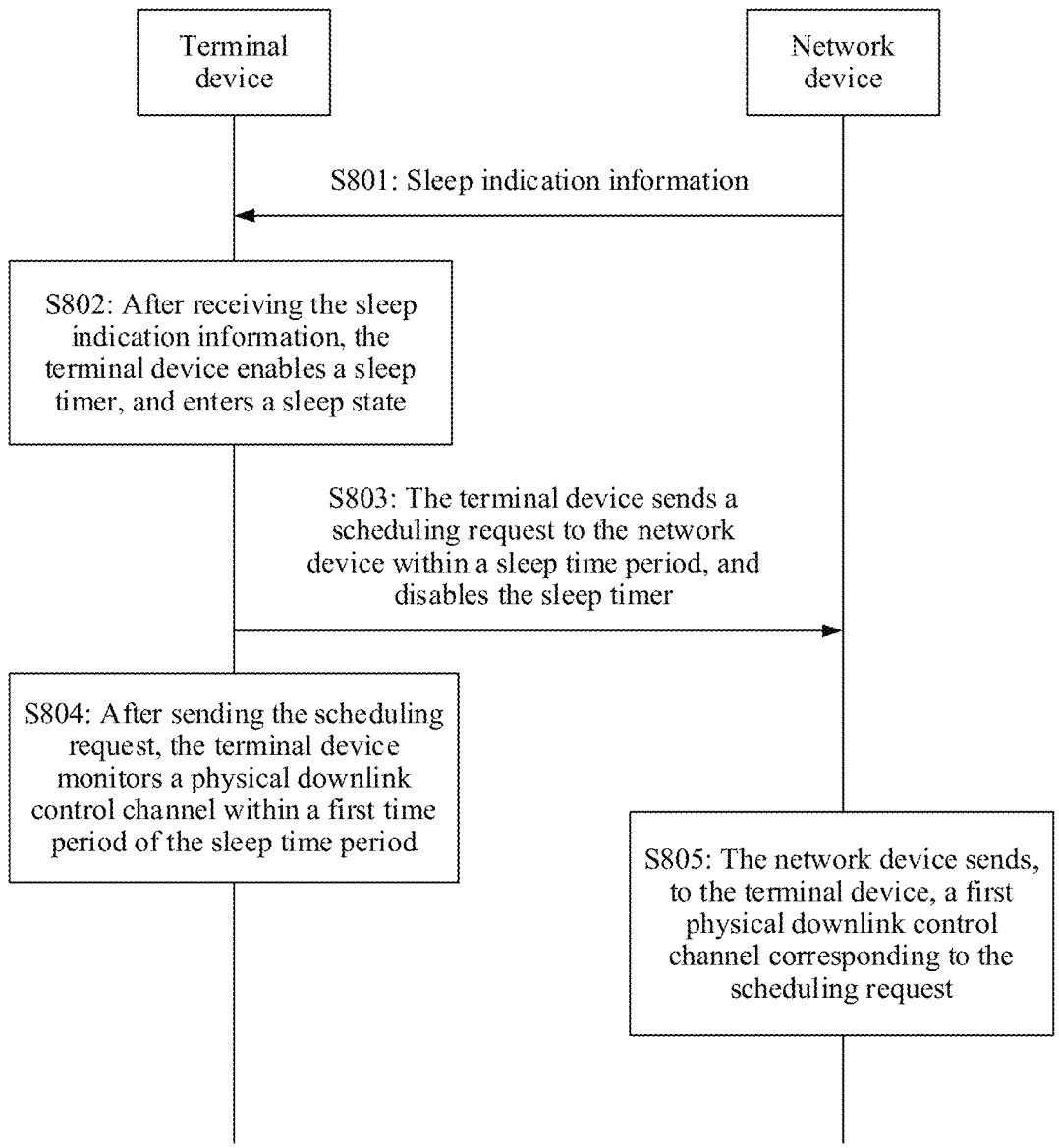
FIG. 8 is a schematic flowchart of still another communication method according to an embodiment of this application.

FIG. 8 is a schematic flowchart of still another communication method according to an embodiment of this application. The communication method includes the following steps.

S801: A network device sends sleep indication information to a terminal device. The terminal device receives the sleep indication information.

The sleep indication information may indicate the terminal device to enter a sleep state.

For specific implementation of this step, refer to step S401 in the embodiment shown in FIG. 4 or step S503 in the embodiment shown in FIG. 5. Details are not described herein again.

S802: After receiving the sleep indication information, the terminal device enables a sleep timer, and enters the sleep state.

A length of a timing period of the sleep timer is equal to a length of a sleep time period.

The network device sends a GTS signal or GTS signaling to the terminal device, to indicate the terminal device not to perform PDCCH monitoring within one of configured GTS durations. The UE receives the GTS, and does not perform PDCCH monitoring, starting from a symbol next to the last symbol in which the GTS is received, or starting from a slot next to a slot in which the GTS is received. For specific implementation of this step, refer to step S504 in the embodiment shown in FIG. 5. Details are not described herein again.

Optionally, before S801, the network device sends, to the terminal device, a physical uplink control channel (PUCCH) resource used for sending an SR.

Optionally, by sending an RRC message to the UE, the network device configures, for the UE, one or more GTS durations and a group of PUCCH resources used for sending an SR.

S803: The terminal device in the sleep state sends a scheduling request to the network device within the sleep time period.

In this step, the terminal device may further disable the sleep timer.

Correspondingly, the network device receives the scheduling request.

The terminal device needs to send uplink data. Therefore, the terminal device sends an SR on one of the configured group of SR resources.

S804: After sending the scheduling request, the terminal device monitors a physical downlink control channel within a first time period of the sleep time period.

Figure 9:
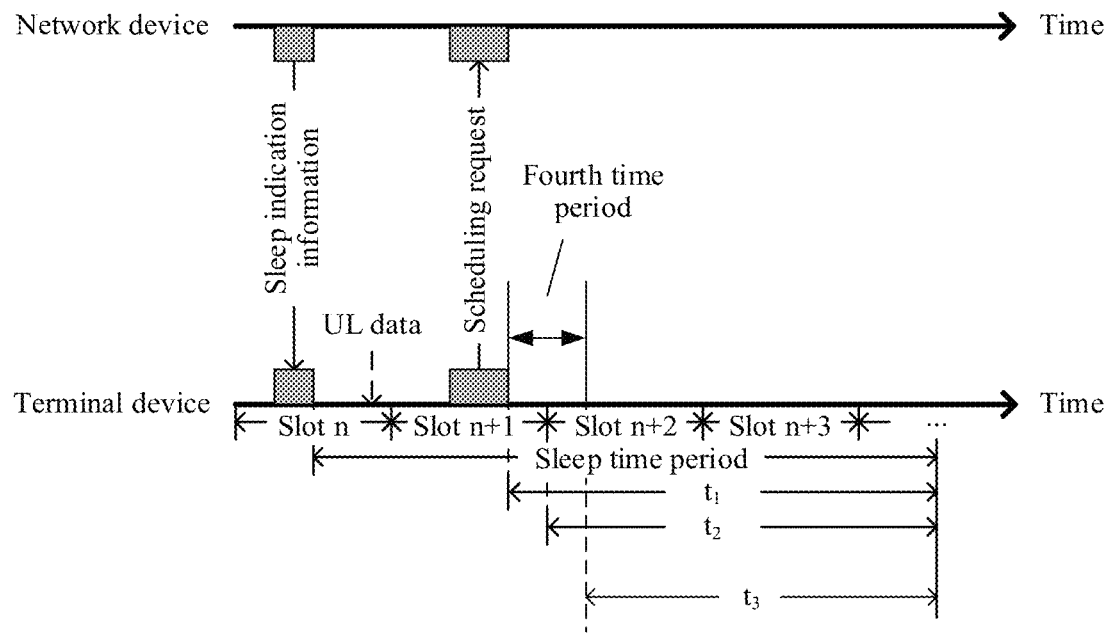
FIG. 9 is a schematic diagram of a terminal device sending a scheduling request after the terminal device enters a sleep state.

FIG. 9 is a schematic diagram of a terminal device sending a scheduling request after the terminal device enters a sleep state. The terminal device may perform PDCCH monitoring in the following implementations.

In an implementation, the terminal device performs PDCCH monitoring, starting from a symbol next to the last symbol occupied by the SR, until a GTS duration ends ($t_1$ shown in FIG. 9).

In another implementation, the terminal device performs PDCCH monitoring, starting from a slot next to a slot occupied by the SR, until the GTS duration ends ($t_2$ shown in FIG. 9).

In another implementation, the terminal device performs PDCCH monitoring, starting from an end of a fourth time period, until the GTS duration ends ($t_3$ shown in FIG. 9). The fourth time period starts from an end of the last symbol occupied by the SR. A length of the fourth time period is semi-statically configured by using RRC signaling. A possible name of the fourth time period is scheduling request round trip time.

S805: The network device sends, to the terminal device, a first PDCCH corresponding to the scheduling request.

For specific implementation of this step, refer to step S405 in the embodiment shown in FIG. 4 or step S507 in the embodiment shown in FIG. 5. Details are not described herein again.

Optionally, if an end moment of the first time period is before an end moment of the sleep time period, the terminal device is in the sleep state from the end moment of the first time period to the end moment of the sleep time period. In this way, power consumption of the terminal device can be reduced as much as possible.

Optionally, the foregoing rule is valid when the GTS duration is greater than or equal to a third threshold. The third threshold may be preconfigured or predefined.

In a conventional technology, a PUSCH required by UE can be scheduled only after a GTS duration ends. Otherwise, the UE cannot detect a PDCCH indicating the PUSCH. Therefore, an SR delay is comparatively long. When the GTS duration is greater than a threshold, and an impact on an SR scheduling delay is excessively large, a gNB may schedule, within the time range t shown in FIG. 9, the PUSCH required by the UE, thereby reducing the SR delay.

This embodiment provides an apparatus used for implementing the foregoing method embodiments. It should be noted that for specific details in this embodiment, refer to the foregoing descriptions, and details are not described in this embodiment again.

Figure 10:
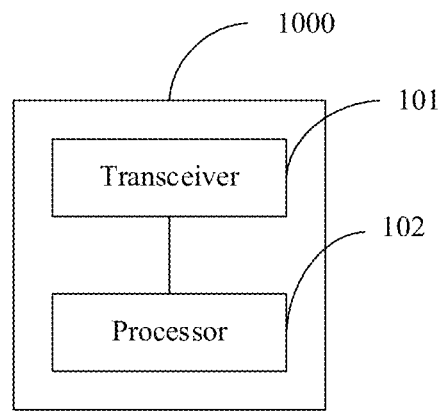
FIG. 10 is a schematic structural diagram of a communication apparatus according to an embodiment of this application.

Based on a same concept as that of the communication methods in the foregoing embodiments, as shown in FIG. 10, an embodiment of this application further provides a communication apparatus 1000. The communication apparatus may be configured to implement the communication methods shown in FIG. 4, FIG. 5, and FIG. 8. The communication apparatus 1000 may be the terminal device 200 shown in FIG. 3, or may be a component (for example, a chip) applied to the terminal device 200. The communication apparatus 1000 includes a transceiver 101 and a processor 102.

The transceiver 101 is configured to send first information to a network device within a sleep time period, where the first information is a scheduling request or a negative acknowledgment NACK.

The processor 102 is configured to: after the transceiver sends the first information, monitor a physical downlink control channel PDCCH within a first time period of the sleep time period.

In an implementation, the first information is the NACK, the NACK is corresponding to a first HARQ process, and the first PDCCH carries a retransmission scheduling indication of the first HARQ process.

The transceiver 101 is further configured to receive a second PDCCH used to schedule a PDSCH, where the PDSCH is corresponding to the first HARQ process.

The transceiver 101 is further configured to: when the terminal device fails to decode the PDSCH, send the NACK to the network device.

In another implementation, the transceiver 101 is further configured to receive sleep indication information from the network device, where the sleep indication information is used to indicate the terminal device to enter the sleep state.

In another implementation, the processor 102 is further configured to: after the transceiver receives the sleep indication information from the network device, enable a sleep timer, where a length of a timing period of the sleep timer is equal to a length of the sleep time period.

In another implementation, the transceiver 101 is further configured to send the first information to the network device.

The processor 102 is further configured to disable the sleep timer.

For more detailed descriptions of the transceiver 101 and the processor 102, refer to related descriptions of the terminal device in the method embodiments shown in FIG. 4, FIG. 5, and FIG. 8. Details are not described herein again.

It should be noted that the transceiver may be an integrated component that has a transceiver function, or may include an independent receiver that has a receiving function and a transmitter that has a sending function, and is logically referred to as a "transceiver".

Figure 11:
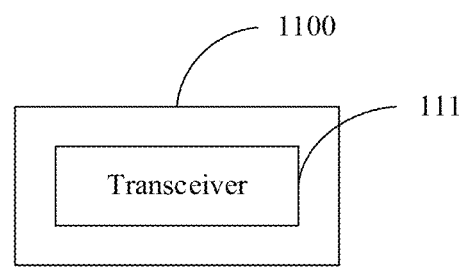
FIG. 11 is a schematic structural diagram of another communication apparatus according to an embodiment of this application.

Based on a same concept as that of the communication methods in the foregoing embodiments, as shown in FIG. 11, an embodiment of this application further provides a communication apparatus 1100. The communication apparatus may be applied to the communication methods shown in FIG. 4, FIG. 5, and FIG. 8. The communication apparatus 1100 may be the network device 100 shown in FIG. 3, or may be a component (for example, a chip) applied to the network device 100. The communication apparatus 1100 includes a transceiver 111.

The apparatus 1100 includes:

a transceiver 111, configured to send sleep indication information to a terminal device, where the sleep indication information is used to indicate the terminal device to enter a sleep state;

the transceiver 111 is further configured to: after the transceiver sends the sleep indication information to the terminal device, and when the terminal device is in a sleep time period, receive first information from the terminal device; and the transceiver 111 is further configured to send, to the terminal device, a first physical downlink control channel PDCCH corresponding to the first information.

In an implementation, the transceiver 111 is further configured to: send the first PDCCH to the terminal device within the sleep time period, or send the first PDCCH to the terminal device after the sleep time period.

In another implementation, the first information is a NACK, the NACK is corresponding to a first HARQ process, and the first PDCCH carries a retransmission scheduling indication of the first HARQ process.

The transceiver unit 111 is further configured to send, to the terminal device, a second PDCCH used to schedule a PDSCH, where the PDSCH is corresponding to the first HARQ process.

The transceiver unit 111 is further configured to: when the terminal device fails to decode the PDSCH, receive the NACK.

For more detailed descriptions of the transceiver 111, refer to related descriptions of the network device in the method embodiments shown in FIG. 4, FIG. 5, and FIG. 8. Details are not described herein again.

It should be noted that the transceiver may be an integrated component that has a transceiver function, or may include an independent receiver that has a receiving function and a transmitter that has a sending function, and is logically referred to as a "transceiver".

An embodiment of this application further provides a communication apparatus. The communication apparatus is configured to perform the foregoing communication methods. Some or all of the foregoing communication methods may be implemented by hardware, or may be implemented by software.

Optionally, in specific implementation, the communication apparatus may be a chip or an integrated circuit.

Optionally, when some or all of the communication methods in the foregoing embodiments are implemented by software, the communication apparatus includes: a memory, configured to store a program; and a processor, configured to execute a program stored in the memory. When the program is executed, the communication apparatus may be enabled to separately implement the communication methods provided by the terminal device and the network device in the embodiments shown in FIG. 4, FIG. 5, and FIG. 8.

Optionally, the memory may be a physically independent unit, or may be integrated with the processor. The memory may alternatively be configured to store data.

Optionally, when some or all of the communication methods in the foregoing embodiments are implemented by software, the communication apparatus may alternatively include only the processor. The memory configured to store the program is located outside the communication apparatus, and the processor is connected to the memory by using a circuit/wire and is configured to read and execute the program stored in the memory.

The processor may be a central processing unit (CPU), a network processor (NP), or a combination of the CPU and the NP.

The processor may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof.

The memory may include a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories.

It may be understood that units in the foregoing communication apparatus embodiments may also be referred to as modules.

Figure 12:
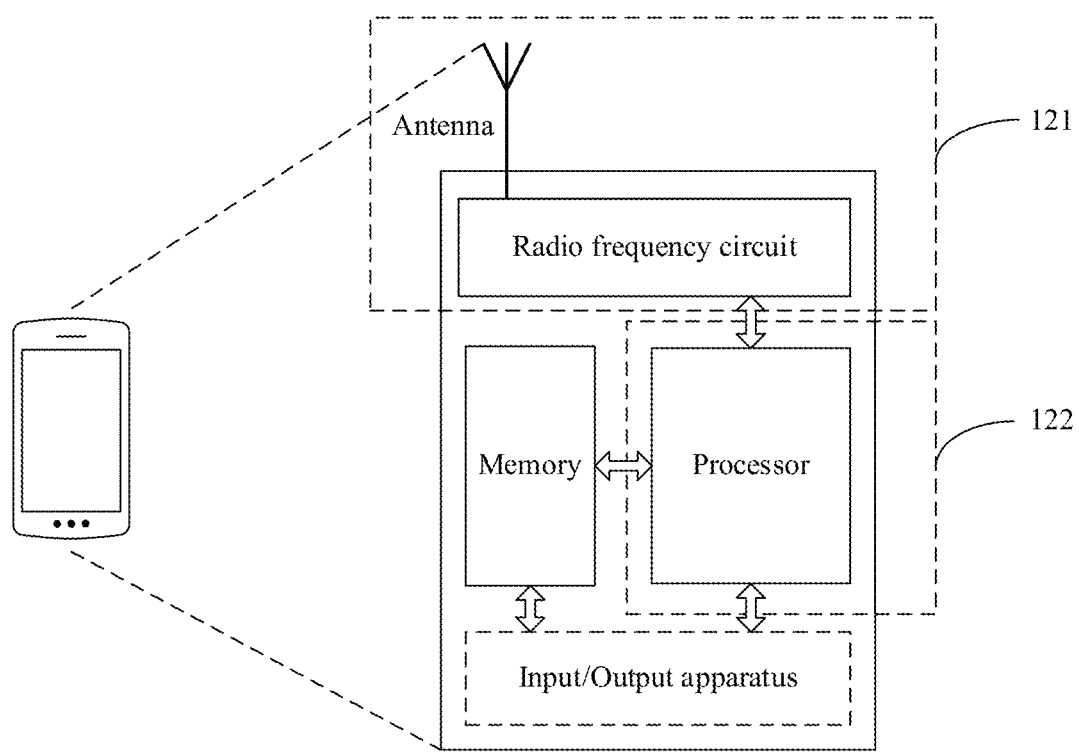
FIG. 12 is a schematic structural diagram of a simplified terminal device according to an embodiment of this application.

FIG. 12 is a schematic structural diagram of a simplified terminal device. For ease of understanding and convenience of figure illustration, an example in which the terminal device is a mobile phone is used in FIG. 12. As shown in FIG. 12, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is mainly configured to store a software program and data. The radio frequency circuit is mainly configured to: convert a baseband signal and a radio frequency signal, and process the radio frequency signal. The antenna panel is mainly configured to transmit and receive a radio frequency signal in an electromagnetic wave form. The input/output apparatus, such as a touchscreen, a display screen, or a keyboard, is mainly configured to receive data input by a user and output data to the user. It should be noted that some types of terminal devices may have no input/output apparatus.

When data needs to be sent, the processor performs baseband processing on to-be-sent data, and then outputs a baseband signal to a radio frequency circuit. After performing radio frequency processing on the baseband signal, the radio frequency circuit sends a radio frequency signal to the outside by using the antenna in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a receiving unit and a sending unit (which may also be collectively referred to as a transceiver unit) of the terminal device, and the processor with a processing function may be considered as a processing unit of the terminal device. As shown in FIG. 12, the terminal device includes a transceiver unit 121 and a processing unit 122. The transceiver unit 121 may also be referred to as a receiver/transmitter (transmitter) machine, a receiver/transmitter, a receiver/transmitter circuit, or the like. The processing unit 122 may also be referred to as a processor, a processing board, a processing module, a processing apparatus, or the like. The transceiver unit 121 is configured to implement functions of the transceiver 101 in the embodiment shown in FIG. 10, and the processor unit 122 is configured to implement functions of the processor unit 102 in the embodiment shown in FIG. 10.

For example, in an embodiment, the transceiver unit 121 is configured to perform functions of the terminal device in steps S401 and S403 in the embodiment shown in FIG. 4. The processing unit 122 is configured to perform steps S402 and S404 in the embodiment shown in FIG. 4.

For another example, in an embodiment, the transceiver unit 121 is configured to perform functions of the terminal device in steps S501 to S503 and S505 in the embodiment shown in FIG. 5. The processing unit 122 is configured to perform steps S504 and S506 in the embodiment shown in FIG. 5.

For another example, in an embodiment, the transceiver unit 121 is configured to perform functions of the terminal device in steps S801 and S803 in the embodiment shown in FIG. 8. The processing unit 122 is configured to perform steps S802 and S804 in the embodiment shown in FIG. 8.

Figure 13:
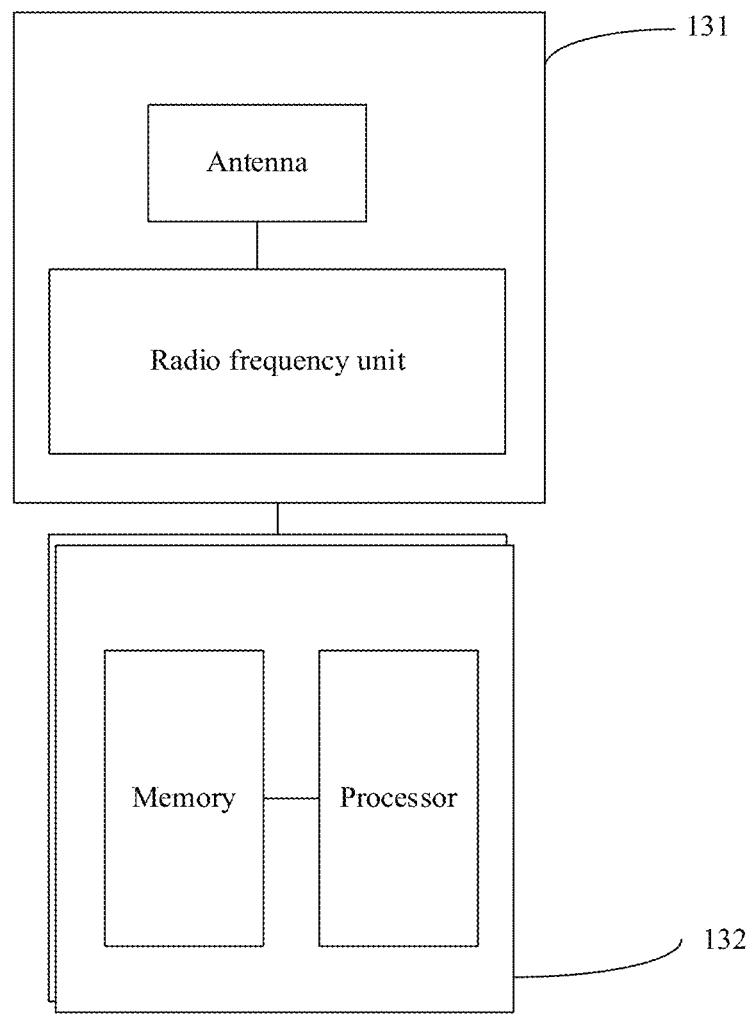
FIG. 13 is a schematic structural diagram of a simplified network device according to an embodiment of this application.

FIG. 13 is a schematic structural diagram of a simplified network device. The network device includes a part for receiving/sending a radio frequency signal and performing conversion and a part 132, and the part for receiving/sending a radio frequency signal and performing conversion further includes a transceiver unit part 131. The part for receiving/sending a radio frequency signal and performing conversion is mainly configured to: receive/send a radio frequency signal and perform conversion between a radio frequency signal and a baseband signal. The part 132 is mainly configured to perform baseband processing and control the network device. The transceiver unit 131 may also be referred to as a receiver/transmitter (transmitter) machine, a receiver/transmitter, a receiver/transmitter circuit, or the like. The part 132 is usually a control center of the network device, and may usually be referred to as a processing unit, configured to control a source network device to perform the steps performed by the network device in FIG. 4, FIG. 5, and FIG. 8. For details, refer to the foregoing descriptions of the related parts. The transceiver unit 131 may be configured to implement functions of the sending unit 111 and the receiving unit 112 in the embodiment shown in FIG. 11.

The part 132 may include one or more boards. Each board may include one or more processors and one or more memories. The processor is configured to read and execute a program in the memory, to implement a baseband processing function and control the network device. If there are a plurality of boards, the boards may be interconnected to enhance a processing capability. In an optional implementation, a plurality of boards may share one or more processors, or a plurality of boards share one or more memories, or a plurality of boards share one or more processors at the same time.

For example, in an embodiment, the transceiver unit 131 is configured to perform functions of the network device in steps S401 and S403 in the embodiment shown in FIG. 4. The part 132 is configured to perform the function in step S405 in the embodiment shown in FIG. 4.

For another example, in another embodiment, the transceiver unit 131 is configured to perform functions of the network device in steps S501 to S503 and S505 in the embodiment shown in FIG. 5. The part 132 is configured to perform step S507 in the embodiment shown in FIG. 5.

For another example, in an embodiment, the transceiver unit 131 is configured to perform functions of the network device in steps S801 and S803 in the embodiment shown in FIG. 8. The part 132 is configured to perform the function in step S805 in the embodiment shown in FIG. 8.

An embodiment of this application further provides a computer-readable storage medium, where the computer-readable storage medium stores computer programs or instructions; and when the computer programs or the instructions are executed, the method in the foregoing aspects is implemented.

An embodiment of this application further provides a computer program product including instructions. When the instructions are run on a computer, the computer is enabled to perform the method in the foregoing aspects.

An embodiment of this application further provides a communications system, including the foregoing communication apparatus.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, division into units is merely logical function division and may be other division in actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted by using a computer-readable storage medium. The computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (read-only memory, ROM), a random access memory (random access memory, RAM), or a magnetic medium such as a floppy disk, a hard disk, a magnetic tape, a magnetic disk, or an optical medium such as a digital versatile disc (digital versatile disc, DVD), or a semiconductor medium such as a solid-state drive (solid-state drive, SSD).

What is claimed is:

1. A communication method, comprising:
    receiving, by a terminal device, sleep indication information from a network device, wherein the sleep indication information indicates to the terminal device to skip physical downlink control channel (PDCCH) monitoring within a sleep time period, and the sleep indication information is carried in downlink control information (DCI);
    sending, the terminal device, a negative acknowledgment (NACK) to the network device within the sleep time period; and
    after sending the NACK, monitoring, by the terminal device, a PDCCH corresponding to the NACK within a first time period of the sleep time period.

2. The method according to claim 1, wherein the first time period is:
    a time period starting from a symbol next to a last symbol occupied by the NACK to an end of the sleep time period; or
    a time period starting from a slot next to a slot occupied by the NACK to an end of the sleep time period.

3. The method according to claim 1, wherein the NACK corresponds to a first hybrid automatic repeat request (HARQ) process; and
    the first time period is a time period starting from a time at which a downlink retransmission timer is enabled to the end of the sleep time period.

4. The method according to claim 1, wherein the first time period is:
    a time period starting from a symbol next to the last symbol occupied by the NACK to a time that is within the sleep time period and at which the terminal device detects a first PDCCH from the network device; or a time period starting from a slot next to a slot occupied by the NACK to a time that is within the sleep time period and at which the first PDCCH from the network device is detected.

5. The method according to claim 1, wherein the NACK corresponds to a first hybrid automatic repeat request (HARQ) process; and
the first time period is:
a timing period of a downlink retransmission timer; or
a time period starting from a time at which a downlink retransmission timer is enabled to a time at which a first PDCCH from the network device is detected.

6. The method according to claim 1, wherein the NACK corresponds to the first HARQ process, and the first PDCCH carries a retransmission scheduling indication of the first HARQ process; wherein
before the sending, by the terminal device, NACK to the network device, the method further comprises:
receiving, by the terminal device, a second PDCCH used to schedule a physical downlink shared channel (PDSCH), wherein the PDSCH corresponds to the first HARQ process; and
the sending, by a terminal device, NACK to a network device comprises:
when the terminal device fails to decode the PDSCH, sending, by the terminal device, the NACK to the network device.

7. The method according to claim 3, wherein the terminal device is in a sleep state within a second time period before the downlink retransmission timer is enabled, wherein the second time period is a timing period of a downlink HARQ round trip time timer, and the downlink retransmission timer and the downlink HARQ round trip time timer correspond to the first HARQ process.

8. A communication method, comprising:
sending, by a network device, sleep indication information to a terminal device, wherein the sleep indication information indicates to the terminal device to skip physical downlink control channel (PDCCH) monitoring within a sleep time period, and the sleep indication information is carried in downlink control information (DCI);
after sending the sleep indication information to the terminal device, and when the terminal device is within thein a sleep state during a sleep time period, receiving, by the network device, a negative acknowledgment (NACK) from the terminal device; and
sending, by the network device, to the terminal device, a first PDCCH corresponding to the NACK within a first time period of the sleep time period.

9. The method according to claim 8, wherein the first time period is:
a time period starting from a symbol next to the last symbol occupied by the NACK to a time that is within the sleep time period and at which the terminal device detects a first PDCCH from the network device; or
a time period starting from a slot next to a slot occupied by the NACK to a time that is within the sleep time period and at which the first PDCCH from the network device is detected.

10. The method according to claim 8, wherein the NACK corresponds to a first HARQ process, and the first PDCCH carries a retransmission scheduling indication of the first HARQ process;
before the receiving, by a network device, NACK from the terminal device, the method further comprises:

sending, by the network device to the terminal device, a second PDCCH used to schedule a PDSCH, wherein the PDSCH corresponds to the first HARQ process; and
the receiving, by a network device, NACK from the terminal device comprises:
when the terminal device fails to decode the PDSCH, receiving, by the network device, the NACK.

11. A communication apparatus, comprising:
a transceiver, configured to receive a sleep indication information, wherein the sleep indication information indicates to the communication apparatus to skip physical downlink control channel (PDCCH) monitoring within a sleep time period, and
the transceiver, further configured to send a negative acknowledgment (NACK) within the sleep time period; and
a processor, configured to: after the transceiver sends the NACK, monitor a PDCCH corresponding to the NACK within a first time period of the sleep time period.

12. The apparatus according to claim 11, wherein the first time period is:
a time period starting from a symbol next to the last symbol occupied by the NACK to an end of the sleep time period; or
a time period starting from a slot next to a slot occupied by the NACK to an end of the sleep time period.

13. The apparatus according to claim 11, wherein the NACK corresponds to a first hybrid automatic repeat request (HARQ) process; and
the first time period is a time period starting from a time at which a downlink retransmission timer is enabled to the end of the sleep time period.

14. The apparatus according to claim 11, wherein the first time period is:
a time period starting from a symbol next to the last symbol occupied by the NACK to a time that is within the sleep time period and at which the processor detects a first PDCCH from the network device; or
a time period starting from a slot next to a slot occupied by the NACK to a time that is within the sleep time period and at which the processor detects a first PDCCH from the network device.

15. The apparatus according to claim 11, wherein the NACK corresponds to a first hybrid automatic repeat request (HARQ) process; and
the first time period is:
a timing period of a downlink retransmission timer; or
a time period starting from a time at which a downlink retransmission timer is enabled to a time at which a first PDCCH from the network device is detected.

16. The apparatus according to claim 11, wherein the NACK corresponds to the first HARQ process, and the first PDCCH carries a retransmission scheduling indication of the first HARQ process;
the transceiver is further configured to receive a second PDCCH used to schedule a physical downlink shared channel (PDSCH), wherein the PDSCH corresponds to the first HARQ process; and
the transceiver is further configured to: when the processor fails to decode the PDSCH, send the NACK to the network device.

17. The apparatus according to claim 13, wherein the apparatus is a terminal device or the apparatus is a component applied in the terminal device, and the terminal device is in a sleep state within a second time period before the downlink retransmission timer is enabled, wherein the second time period is a timing period of a downlink HARQ round trip time timer, and the downlink retransmission timer and the downlink HARQ round trip time timer correspond to the first HARQ process.

18. A communication apparatus, comprising:
   a transceiver, configured to send sleep indication information, wherein the sleep indication information indicates to a terminal device to skip physical downlink control channel (PDCCH) monitoring within a sleep time period, and the sleep indication information is carried in downlink control information (DCI);
   the transceiver is further configured to: after the transceiver sends the sleep indication information, and when the terminal device is within the sleep time period, receive a negative acknowledgment (NACK) from the terminal device; and
   the transceiver is further configured to send, a first PDCCH corresponding to the NACH within a first time period of the sleep time period.

19. The apparatus according to claim 18, wherein the first time period is:
   a time period starting from a symbol next to the last symbol occupied by the NACK to a time that is within the sleep time period and at which the terminal device detects a first PDCCH from the network device; or
   a time period starting from a slot next to a slot occupied by the NACK to a time that is within the sleep time period and at which the first PDCCH from the network device is detected.

20. The apparatus according to claim 18, wherein the NACK corresponds to a first HARQ process, and the first PDCCH carries a retransmission scheduling indication of the first HARQ process;
   the transceiver is further configured to send, to the terminal device, a second PDCCH used to schedule a PDSCH, wherein the PDSCH corresponds to the first HARQ process; and
   the transceiver is further configured to: when the terminal device fails to decode the PDSCH, receive the NACK.

* * * * *

UNITED STATES PATENT AND TRADEMARK OFFICE
CERTIFICATE OF CORRECTION

| | |
|---|---|
| PATENT NO. | : 12,096,362 B2 |
| APPLICATION NO. | : 17/371654 |
| DATED | : September 17, 2024 |
| INVENTOR(S) | : Lixia Xue |

It is certified that error appears in the above-identified patent and that said Letters Patent is hereby corrected as shown below:

In the Claims

In Column 22, Line 43, in Claim 1, delete "the" and insert -- by the --.

In Column 23, Line 46, in Claim 8, delete "thein a sleep state during a" and insert -- the --.

Signed and Sealed this
Third Day of December, 2024

Katherine Kelly Vidal
*Director of the United States Patent and Trademark Office*